United States Patent [19]

Kobashi et al.

[11] Patent Number: 4,659,847

[45] Date of Patent: Apr. 21, 1987

[54] CHEMICALLY STABLE COLLOIDAL ANTIMONY OXIDE

[75] Inventors: Toshiyuki Kobashi; Hideo Naka, both of Okayama, Japan

[73] Assignee: Japan Exlan Company, Ltd., Osaka, Japan

[21] Appl. No.: 717,838

[22] Filed: Mar. 29, 1985

[30] Foreign Application Priority Data

May 25, 1984 [JP] Japan .................... 59-107049

[51] Int. Cl.$^4$ ............................. C07F 9/68
[52] U.S. Cl. ............................. 556/5; 556/2; 556/10
[58] Field of Search .................... 556/2, 5, 10

[56] References Cited

U.S. PATENT DOCUMENTS

| | | | |
|---|---|---|---|
| 2,994,711 | 8/1961 | Cohen | 556/10 |
| 3,728,367 | 4/1973 | Yates | 556/2 |
| 3,758,535 | 9/1973 | Vizurraga | 556/10 |
| 4,336,168 | 6/1982 | Hoch et al. | 556/2 |

OTHER PUBLICATIONS

Borisov et al, Organosilicon Heteropolymers and Heterocompounds, Plenum Press, N.Y., pp. 473–479, (1970).

*Primary Examiner*—Helen M. S. Sneed
*Attorney, Agent, or Firm*—Wenderoth, Lind & Ponack

[57] ABSTRACT

The present invention provides chemically stable colloidal antimony oxide which has been treated with a particular organosilicon compound in the ratio of from 0.5 to 25 weight % based on the antimony and whose pH has been regulated to within the range of from 2 to 12.

9 Claims, No Drawings

CHEMICALLY STABLE COLLOIDAL ANTIMONY OXIDE

BACKGROUND OF THE INVENTION a. Field of the Invention

The present invention relates to colloidal antimony oxide, and more specifically it relates to a chemically stable colloidal dispersion of antimony oxide which has been treated with a particular organosilicon compound and regulated to a particular pH range.

b. Description of the Prior Art

In order to make fabrics, fibers, plastics, etc. flame retardant, antimony oxide has been heretofore used together with halogen-containing substances such as organic chlorides, bromides, etc. However, in the case where the particle diameter of the antimony oxide is on the order of the size of pigments, i.e. from 0.5 to 5μ, the touch, gloss, transparency, physical properties, etc. of the product are impaired. Therefore, several proposals have been made on the production methods of antimony oxide in fine particle form, as shown in Japanese Patent Publication No. 20479/1978, No. 11848/1982, Japanese Patent Kokai No. 123997/1977, etc.

By these methods it is possible to produce colloidal antimony oxide, but when it is dried by spray drying, etc., the primary particles agglomerate and unite, and therefore it is substantially impossible to take out dry powder in fine particle form.

On the other hand, even if it is attempted to use the antimony oxide as a colloidal dispersion, when an inorganic salt is present in the system which contains said dispersion or when the dispersion is mixed with vinyl chloride latex or vinylidene chloride latex, the colloidal particles will agglomerate and unite. Therefore, there is a great limitation in practical use, and problems in its application remain unsolved.

Colloidal antimony oxide, whose such problems have been entirely solved and which is especially chemically stable, can be provided by treating colloidal antimony oxide with an organosilicon compound represented by the following general formula:

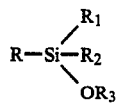

wherein R is a $C_{1-8}$ substituent containing no amino group, mercapto group, methacryloxy group or halogen atom; each of $R_1$ and $R_2$ is a $C_{1-4}$ substituent; and $R_3$ is a $C_{1-4}$ alkyl group, alkoxy-substituted alyl group or acetyl group, and by regulating the pH of the colloidal antimony oxide to within the range of from 2.5 to 12.

DETAILED DESCRIPTION OF THE PREFERRED EMBODIMENT

In the following the method of the present invention is explained concretely, and firstly a detailed explanation is given on the organosilicon compounds of the present invention represented by the above-mentioned general formula.

R is a $C_{1-8}$ substituent, preferably a $C_{1-6}$ substituent, containing no amino group, mercapto group, methacryloxy group, or halogen atom. In the case where the number of carbon atoms exceeds the upper limit or it contains the above-mentioned functional groups, it is impossible to provide a colloidal antimony oxide dispersion especially excellent in chemical stability which is the object of the present invention. Examples of such substituent R are vinyl groups, $C_{1-4}$ lower alkyl groups, γ-glycidoxypropyl groups, β-(3,4-epoxycyclohexyl) ethyl groups, etc. Among others, vinyl groups and $C_{1-4}$ lower alkyl groups desirable.

$R_1$ and $R_2$ are the same or different $C_{1-4}$ substituents, and as such substituents may be mentioned for example alkyl groups such as methyl, ethyl, etc., alkoxy groups suh as methoxy, ethoxy, etc., alkoxy-substituted alkyl groups such as β-methoxyethyl, etc., acetyl group, acetoxy group, etc. Among others, $C_{1-2}$ alkoxy group and acetoxy group are desirable. $R_3$ shows alkoxy-substituted alkyl group or acetyl group as far as the number of carbon atoms is less than 4.

The method of treatment with the above-mentioned organosilicon compounds is to add to a colloidal antimony oxide dispersion, an organosilicon compound in the ratio of 0.5 to 25 weight %, preferably 2 to 15 weight %, more preferably 3 to 10 weight %, based on the antimony in said dispersion, and then to cause to react under stirring at a temperature from 30° to 100° C., preferably from 60° to 100° C. for a period of time of 10 minutes to 3 hours, preferably 30 minutes to 1.5 hours. The use of an amount of the organosilicon compound exceeding the upper limit of the invention does not bring about a further improvement and moreover it is economically undesirable.

In order to improve the storage stability under the coexistence of inorganic salt, it is important to regulate the pH of the colloidal dispersion after the above-mentioned treatment to within the range of from 2.5 to 12, preferably from 5 to 9. Only after such regulation, the chemical stability of the colloidal dispersion imparted by the organosilicon compound treatment can be maintained without any change with the passage of time. Since the usual colloidal dispersion before the regulation shows a pH value about 2, the pH is advantageously regulated by the addition of a desired amount of an alkaline substance such as an alkali-metal hydroxide, ammonia, an amine, etc. Among others, when a hydroxyl group-containing organic amine such as an N-alkyl-substituted or a non-substituted ethanolamine or a diethanol amine, triethanolamine, tris(oxymethyl)methylamine, 1,3-diaminopropane-2-ol, etc. is used as the pH regulating agent, no agglomeration will occur even if the colloidal dispersion is concentrated.

As for the antimony oxide concentration in the colloidal antimony oxide dispersion to be treated, it is generally suitable to be more than 5 weight %, preferably from 10 to 50 weight %. Also as for the method of producing the colloidal dispersion, there is no limitation, and any known method can be employed as described in Japanese Patent Publication No. 20479/1978, Japanese Patent Kokai No. 123997/1977, etc. However, from an industrial viewpoint, the method described in Japanese Patent Application No. 108940 is recommended wherein upon reacting antimony trioxide with hydrogen peroxide, an inorganic alkaline substance in an amount of 1.5 to 30 mol %, based on the antimony trioxide, is added to the reaction system.

The disperse medium of the colloidal dispersion is usually water. But a water-miscible organic solvent such as alcohol, acetone, etc. may be mixed with water.

We do not fully understand why the colloidal antimony oxide according to the present invention has excellent chemical stability over a long time. However, we suppose that a silane coupling reaction takes place between the antimony oxide and organosilicon compound, and as a result, the substituent R of the organosilicon compound existing between the fine particles of the antimony oxide and the disperse medium plays some role in suppressing the agglomeration and union of the antimony oxide particles induced by an inorganic salt or latex mixed in the dispersion. Also it is supposed that when the pH of the dispersion is regulated to within the particular range, such action is displayed effectively.

The colloidal antimony oxide according to the present invention is greatly improved in chemical stability, especially in the stability to inorganic salts and in the compatibility with latex. Accordingly, it is applicable to the use of flame retardant synergetic agents, etc. without any limitations in practical use. It is also a characteristic advantage of the present invention that the colloidal oxide of the invention is applicable without impairing the touch, gloss, transparency, physical properties, etc. of the final product since the state of the fine particles is not changed.

The product of the present invention is improved not only in chemical stability but also in physical stability (for example, stability to a mechanical stimulus such as stirring, mixing, etc., thermal stimulus such as heating, cooling, freezing, etc.) and in the stability to agglomeration upon concentration. Therefore, it can be added to high molecular latexes, high molecular solutions, etc. whenever occasion calls, and is widely applicable to the use for fibers, plastic molded products, etc.

For a better understanding of the present invention, Examples are set forth in the following. However, the gist of the invention is not limited by the description of the Examples, wherein all percentages and parts are by weight unless otherwise indicated.

In the following Examples, the percent transmission of light (T %), stability to salts, and compatibility with latex were measured by the following methods:

1. Percent transmission of light (T %)

The percent transmission of white light through a colloidal antimony oxide dispersion having a concentration of 0.4% as antimony, was measured by means of a HITACHI-101 Spectrophotometer (product of Hitachi Ltd.). The larger this value, the smaller the colloidal particles.

2. Stability to salts

A sample solution was prepared by adding a colloidal antimony oxide dispersion having a concentration of 0.4% as antimony, to an aqueous NaCl solution having a concentration of 1%. After the passage of predetermined periods of time, the percent transmission of light through the sample solution was measured to evaluate the stability.

3. Compatibility with latex

To a polyvinyl chloride latex (SUMIELITE 1010, solid matter: 50%, produced by Sumitomo Chemical Co. Ltd.), a colloidal antimony oxide dispersion was added in an amount corresponding to 2% in concentration as antimony. The state of the generation of agglomeration and precipitation was observed and evaluated.

EXAMPLE 1

Into a three-neck flask (capacity one liter) equipped with a stirrer, 13 parts of $Sb_2O_3$, 80 parts of water and one part of caustic soda were charged, and the flask was immersed into a thermostat of 90° C. The mixture was made into a slurry by stirring. When the temperature of the content reached 80° C., 6.9 parts of an aqueous $H_2O_2$ solution (concentration: 35%) was added and the mixture was caused to react for one hour. In this way, a colloidal antimony oxide dispersion of about 14% in concentration was produced.

To the thus-obtained dispersion, each of the organosilicon compounds shown in Table 1 was added in an amount of 5%, based on Sb. The mixture was caused to react under stirring at 85° C. for one hour, and was regulated pH 7 with triethanolamine.

The stability to NaCl of the resulting products (after the passage of 30 minutes) was evaluated. The results are shown in Table 1 together with the value of a non-treated product.

TABLE 1

| Sample no. | Samples of the invention | | | | | | | Samples for comparison | | | |
|---|---|---|---|---|---|---|---|---|---|---|---|
| | 1 | 2 | 3 | 4 | 5 | 6 | 7 | 8 | 9 | 10 | 11 |
| Organosilicon compound | a | b | c | d | e | f | g | h | i | j | — |
| T % | 97 | 95 | 92 | 96 | 87 | 97 | 93 | 15 | 25 | 8 | 22 |

Note:
a: $CH_3Si(OCH_3)_3$
b: $CH_3Si(OC_2H_5)_3$
c: $CH_2{=}CHSi(OCH_3)_3$
d: $CH_2{=}CHSi(OOCCH_3)_3$
e: $CH_2{=}CHSi(OC_2H_4OCH_3)_3$
f: $CH_2\underset{O}{\overset{}{\diagdown\diagup}}CH{-}CH_2OC_3H_6Si(OCH_3)_3$ g: $CH_2\underset{O}{\overset{}{\diagdown\diagup}}CH{-}CH_2OC_3H_6\underset{CH_3}{\overset{}{Si}}(OC_2H_5)_2$ h: $-NHC_3H_6Si(OCH_3)_3$ i: $HSC_3H_6Si(OCH_3)_3$
j: $CH_3SiCl_3$ From Table 1, one can clearly understand the improving effect by the products of the present invention on the stability to NaCl.

EXAMPLE 2

In the same way as in Example 1 (No. 1), an organosilicon compound-treated colloidal antimony oxide (No. 12) was produced.

Then the stability to NaCl (after the passage of 30 minutes) of samples regulated to various pH values with a 5% aqueous caustic soda solution was evaluated. The results are shown in Table 2.

TABLE 2

| Sample no. | 12 | 13 | 14 | 15 | 16 | 17 |
|---|---|---|---|---|---|---|
| pH | 2.2 | 3 | 5 | 6 | 9 | 12 |
| T % | 42 | 64 | 81 | 89 | 85 | 77 |

From the above Table, it is clearly understand that by the regulation of pH values, the stability to NaCl was remarkably improved.

EXAMPLE 3

Samples were produced in the same way as in Example 1 (No. 1) except that the treating amounts of the organosilicon compound were changed.

The results of the evaluation of the stability to NaCl (after the passage of 3 minutes and 30 minutes) are shown in Table 3.

TABLE 3

| Sample No. | 18 | 19 | 20 | 21 | 22 | 23 | 24 |
|---|---|---|---|---|---|---|---|
| Amount of treatment (% based on Sb) | 1.0 | 2.0 | 3.0 | 5.0 | 10.0 | 20.0 | 25.0 |
| T (%) | | | | | | | |
| 3 minutes | | | | | | | |
| No pH adjustment | 31 | 32 | 40 | 65 | 93 | 96 | 96 |
| pH = 7 | 72 | 75 | 81 | 86 | 96 | 97 | 97 |
| 30 minutes | | | | | | | |
| No pH adjustment | 23 | 24 | 26 | 30 | 93 | 95 | 96 |
| pH = 7 | 54 | 56 | 59 | 64 | 96 | 97 | 97 |

From the above Table, it is understood that the stability to NaCl was remarkably improved by the treatment with the organosilicon compound of the amounts within the range recommended by the present invention, and that treating amounts increased beyond a necessary amount did not produce a further improving effect.

EXAMPLE 4

Samples were produced in the same way as in Example 1 (No. 1) except that the treating amounts were changed as described in Table 4.

The results of the evaluation of the compatibility with latex are shown together in Table 4.

TABLE 4

| Sample no. | Treating amount % based on Sb | Compatibility with latex |
|---|---|---|
| 25 | 0 | After 2 minutes, agglomeration and precipitation occurred. |
| 26 | 1.0 | After 30 minutes, agglomeration and precipitation occurred a little. |
| 27 | 4.0 | After 24 hours, no agglomeration occurred. |
| 28 | 10.0 | After 24 hours, no agglomeration occurred. |

From the above Table, one can clearly understand the improving effect in compatibility with latex of the products of the present invention.

What is claimed is:

1. Chemically stable colloidal antimony oxide which has been stabilized by reacting it with an organosilicon compound at a temperature of from 30° C. to 100° C. for a period of from 10 minutes to 3 hours in which the organosilicon compound is present in an amount of from 0.5 to 25 weight % based on the antimony and whose pH has been regulated to within the range of from 2 to 12, said organosilicon compound having the structural formula:

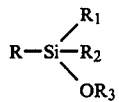

wherein R is a $C_{1-8}$ substituent containing no amino group, mercapto group, methacryloxy group, or halogen atom; each of $R_1$ and $R_2$ is a $C_{1-4}$ substituent; and $R_3$ is a $C_{1-4}$ alkyl group, alkoxy-substituted alkyl group or acetyl group.

2. The colloidal antimony oxide as claimed in claim 1 wherein the substituent R is a vinyl group or a $C_{1-4}$ lower alkyl group.

3. The colloidal antimony oxide as claimed in claim 1 or claim 2 wherein the substituent $R_1$ and $R_2$ are $C_{1-2}$ alkoxy groups or acetoxy groups which are the same or different.

4. The colloidal antimony oxide as claimed in claim 1 which has been treated with 2 to 15 weight %, based on the antimony, of an organosilicon compound.

5. The colloidal antimony oxide as claimed in claim 1 wherein the pH has been regulated to within the range of from 5 to 9.

6. The colloidal antimony oxide as claimed in claim 1 wherein the pH has been regulated with a hydroxyl group-containing organic amine.

7. The colloidal antimony oxide according to claim 3 wherein the colloidal antimony oxide is stabilized by reacting a dispersion of the colloidal antimony oxide with 2 to 15% by weight of an organosilicon compound at a temperature of from 60° to 100° C. for a time period of 30 minutes to 1.5 hours.

8. A method of stabilizing colloidal antimony oxide which comprises reacting a dispersion of colloidal antimony oxide with an organosilicon compound shown in the following formula in the proportions of from 0.5 to 25%, based on the weight of the antimony, and at a temperature of from 30° C. to 100° C., said organosilicon compound having the formula:

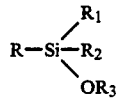

wherein R is a $C_{1-8}$ substituent containing no amino group, mercapto group, methacryloxy group, or halgen atom; each of $R_1$ and $R_2$ is a $C_{1-4}$ substituent; and $R_3$ is a $C_{1-4}$ alkyl group, alkoxy-substituted alkyl group or acetyl group.

9. A method as claimed in claim 8 wherein the colloidal dispersion after the said treatment is adjusted to a pH of from 2.5 to 12.

* * * * *